United States Patent
Lochan et al.

(10) Patent No.: US 10,554,747 B2
(45) Date of Patent: Feb. 4, 2020

(54) SECURE FILE TRANSFER USING PEER TO PEER WIRELESS COMMUNICATION WITH AUTHENTICATION THROUGH SOCIAL NETWORK CONNECTIONS

(71) Applicant: Facebook, Inc., Menlo Park, CA (US)

(72) Inventors: Gaurav Lochan, Palo Alto, CA (US); William Shun Xiao, New York, NY (US); Lindsey Kremer Ruben, San Francisco, CA (US); Annika Lenore Fusco, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 65 days.

(21) Appl. No.: 15/827,358

(22) Filed: Nov. 30, 2017

(65) Prior Publication Data

US 2019/0166195 A1    May 30, 2019

(51) Int. Cl.
*G06F 15/16* (2006.01)
*H04L 29/08* (2006.01)
*G06F 21/10* (2013.01)

(52) U.S. Cl.
CPC .......... *H04L 67/1095* (2013.01); *G06F 21/10* (2013.01); *H04L 67/104* (2013.01); *H04L 67/18* (2013.01)

(58) Field of Classification Search
CPC ....... H04W 4/021; H04W 12/06; H04W 4/02; H04W 4/029; H04W 84/18; H04W 12/08; H04W 4/023; G07F 17/34; G07F 17/3225; G07F 17/3213; G07F 17/3211; G07F 17/3244; G07F 17/3267
See application file for complete search history.

(56) References Cited

U.S. PATENT DOCUMENTS

| | | | | |
|---|---|---|---|---|
| 5,835,911 | A * | 11/1998 | Nakagawa | ............... G06F 8/65 |
| 7,170,999 | B1 * | 1/2007 | Kessler | ................ G06F 21/606 |
| | | | | 380/201 |
| 2012/0124178 | A1 * | 5/2012 | Sparks | .................... H04L 67/06 |
| | | | | 709/219 |
| 2012/0190386 | A1 | 7/2012 | Anderson | |
| 2012/0226752 | A1 * | 9/2012 | Jeong | ..................... H04W 4/21 |
| | | | | 709/204 |
| 2014/0095293 | A1 | 4/2014 | Abhyanker | |
| 2014/0304700 | A1 * | 10/2014 | Kim | .......................... G06F 8/65 |
| | | | | 717/173 |
| 2016/0048796 | A1 | 2/2016 | Todasco | |
| 2018/0150129 | A1 * | 5/2018 | Thomas | ................. G06F 3/011 |

* cited by examiner

*Primary Examiner* — Michael A Keller
*Assistant Examiner* — Thao D Duong
(74) *Attorney, Agent, or Firm* — Fenwick & West LLP (57) ABSTRACT

A computer system allows two devices operated by two users from a plurality of trusted users to establish a direct peer to peer wireless connection based on a social network connection. An online system uses social network connection information to determine trusted users for each of the client devices, and monitors the geographic locations of the client devices. Responsive to determining that the client devices are within a predetermined distance from each other and are trusted users for each other, the online system transmits connection information to the client devices, prompting the client devices to establish a direct peer to peer wireless connection through which content can be transmitted.

18 Claims, 5 Drawing Sheets

SECURE FILE TRANSFER USING PEER TO PEER WIRELESS COMMUNICATION WITH AUTHENTICATION THROUGH SOCIAL NETWORK CONNECTIONS

FIELD

This application relates generally to a secure file transfer, and in particular to establishing a point-to-point wireless communication based on a social network connection.

BACKGROUND

Numerous electronic files are shared by electronic devices. For example, electronic documents, electronic videos files, or program installation files (e.g., Android Package Kit (APK) may be uploaded from an electronic device (e.g., a computer, a laptop, a smartphone, a tablet PC, etc.) to a server computer, and downloaded from the server computer to a portable electronic device (e.g., smartphone or table PC). Often, the transfer of files is performed through a subscribed wireless connection (e.g., 2G, 3G, or 4G connection) managed by a wireless service provider. The wireless service provider charges fees to a user of the portable device based on an amount of data transferred. However, the cost of the subscribed wireless connection may discourage users from sharing electronic files.

To avoid usage of the subscribed wireless connection, the portable devices may establish a direct peer to peer (P2P) wireless connection conforming to, for example, Wi-Fi Direct®, Bluetooth®, near field communication (NFC) or other limited range communication protocols. Such direct P2P wireless connection may allow two or more portable devices to share electronic files without incurring fees from the wireless service provider. However, a direct P2P wireless connection between two portable devices is limited to a predetermined range (e.g., 2 m). Hence, it may be difficult for one portable device to identify another portable device located within the predetermined range that includes the desired electronic file. Moreover, P2P wireless connections are not secure in that a portable device could establish a P2P wireless connection with a malicious entity. Via the connection the malicious entity can provide the portable device with malicious files, such as a virus, Trojan horses, spyware, etc.

Accordingly, some users may be discouraged from receiving up-to date electronic files (e.g., updated installation package files, recent document, recent audio/video files) on portable devices operated by the users.

SUMMARY

Embodiments of the present disclosure provide methods (systems and non-transitory computer readable medium storing instructions) for establishing a direct P2P wireless connection between two portable devices associated with two users based on a social network connection. In one or more embodiments, an online system determines trusted users of respective portable devices, based upon received device information and social network connection information. The online system further monitors geographic locations of each portable device. Responsive to the online system detecting two portable devices associated with users having a trusted relationship within a predetermined geographic proximity of each other, the online system transmits connection information to each portable device to cause the portable devices may establish a direct P2P wireless connection with each other.

In one or more embodiments, the online system determines trusted users of a first portable device and a second portable device, based on device information and social network connection information of the first and second portable devices. Device information of a portable device indicates an identifier corresponding to a user of the portable device. In some embodiments, device information may further comprise a geographic location of the portable device, a list of content stored by the portable device, a version of content stored by the portable device, etc. Social network connection information of a user indicates a social network connection of the user. For example, the online system generates a trusted users data structure indicating users who are associated with each other based upon social network connection information of the respective users. In some embodiments, the online system further generates the trusted users data structure based upon content or version of content stored, and/or geographic regions.

In one or more embodiments, responsive to determining that two portable devices having a trusted relationship are with a predetermined proximity of each other, the online system transmits connection information prompting the two portable devices to establish a direct P2P wireless connection with each other. In one approach, two portable devices broadcast limited range signals for establishing a direct P2P wireless connection. A limited range signal is a signal identifying a user or user name of a portable device transmitting the limited range signal. Based on the limited range signals, each of the two portable devices can confirm that the other device corresponds to the portable device indicated by the connection information, and establish the direct P2P wireless connection, allowing for content to be transmitted between the portable devices.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "204a," indicates the text refers specifically to the element having that particular reference numeral. A reference numeral in the text without a following letter, such as "204," refers to any or all of the elements in the figures bearing that reference numeral (e.g., "204" in the text refers to reference numerals "204a," "204b" and/or "204c" in the figures).

DETAILED DESCRIPTION

Overview

Embodiments relate to the establishment of peer to peer (P2P) limited range wireless connections for sharing content between different client devices, based upon social network information associated with users corresponding to the client devices. The use of P2P connections may allow for users of client devices to share content without needing to rely upon subscribed wireless connections provided by wireless service providers (e.g., a cellular network).

However, because P2P connections may not always be secure, each client device only establishes P2P connections with other client devices associated with "trusted" users, as determined based upon social network information associated with the users. For example, in some embodiments if a first user is connected to a second user on a social network system (e.g., is a "friend" of the second user on the social network), then a P2P connection may be established between the client devices of the first and second users, and used to transmit content between the respective client devices, without needing to access a cellular network. For example, users in a geographic region in which data costs are high may be unable to receive updates to a mobile application for a social networking system (e.g., FACEBOOK®) and thus may frequently have an outdated version of the mobile application. The online system ensures that these users receive the latest mobile application updates via peer to peer connections with other users who have the latest version and who have been verified by the online system as trusted users (thus avoiding possibly installing an infected application from a malicious entity). In some cases, the P2P connection is established automatically whenever the user is in range for connection with a trusted user such that mobile application update can occur seamlessly as it would if there were a cellular data connection.

Figure 1:
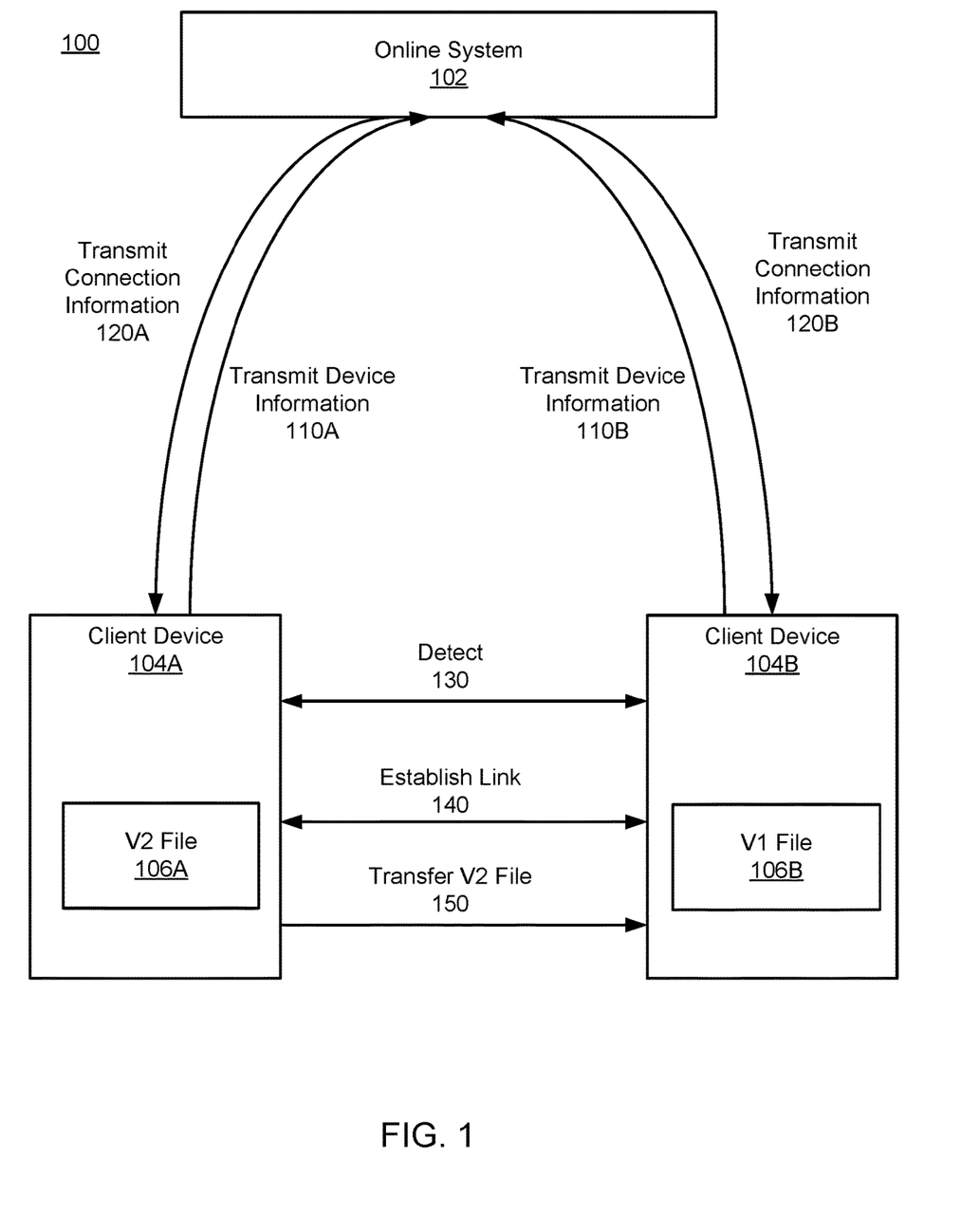
FIG. 1 (FIG. 1) is a block diagram illustrating a high-level overview of establishing a P2P limited range wireless connection based on social network information, according to one embodiment.

FIG. 1 is a block diagram illustrating a high-level overview of establishing a peer to peer (P2P) limited range wireless connection based on social network information, according to one embodiment. FIG. 1 illustrates an online system 102 (e.g., a content provider system), and client devices 104A and 104B (e.g., portable device such as a smartphone and a tablet PC) associated with a first user and a second user, respectively. The online system 102 and the client devices 104 operate together to establish a direct P2P limited range connection between the client devices 104A and 104B. Through the limited range connection the two client devices 104 share content. Examples of content shared include electronic documents, electronic videos, electronic images, executable files such as installation packages, etc.

In this example of FIG. 1, each of the client devices 104A and 104B store a different version of a file 106. The client device 104B is storing a first version 106B of a file and client device 104A is storing a second version 106A of the file, where the second version 106A corresponds to a later version of the file relative to the first version 106B. The file may be, for example, a mobile application used by users to communicate with the online system 102 via client devices 104. For client devices 104 to establish a connection, the online system 102 receives, for each client device 104 associated with a corresponding user, device information 110 associated with the client device 104, and transmits connection information 120 to the client devices 104 if a connection is determined to be appropriate. Hence, for client device 104A, the online system 102 receives device information 110A and transmits connection information 120A, and for client device 104B, the online system 102 receives device information 110B and transmits connection information 120B.

The online system 102 may store data for each client device 104 that includes information of trusted users with whom the respective user of the device 104 should feel safe establishing a connection. In one embodiment, the online system 102 is a social networking system that provides a social networking service and determines the trusted users for each client device 104 based on social network connection information. In one embodiment, the online system 102 may generate and store a list or other type of data structure that includes, for each client device 104, information for users that have a connection with the user of the client device 104 through the social networking service. For example, a list generated for a client device 104 may include information for users that have a friendship type connection with the user of the client device 104 through the social networking service.

In one embodiment, each user associated with a client device 104 accessing the online system 102 is associated with a unique identifier. The identifier, for example, may be assigned to the user when he/she creates an account with the online system 102 or may be a hash of the identifier assigned to the user. In another example, the online system 102 randomly assigns the identifier to each user, wherein the assigned identifier is periodically updated. In one embodiment, the online system 102 may maintain a mobile number of a user and/or a password for establishing a limited range wireless connection with the user.

The online system 102 receives device information 110A from the client device 104A, and device information 110B from the client device 104B. The device information 110 may comprise the identifier corresponding to the user associated with the client device 104. In addition, the device information 110 may comprise information indicating a current geographic location of the client device 104. In some embodiments, the geographic location may be determined based upon a GPS or other type of location sensor associated with the client device 104. In some embodiments, the geographic information may be determined based upon network information associated with the client device, such as an IP address. For example, if the client device 104 is connected to the online system 102 through a wireless network, a geographic location of the client device 104 may be determined based upon a known location of the wireless network. In some embodiments, the geographic location is determined based upon information provided by the user of the client device 104, such as a shared location or a tagged picture. In some embodiments, the online system 102 determines the geographic location of the client device 104 using the received information. In other embodiments, the client device 104 determines the geographic location and transmits the determined geographic location to the online system 102.

The device information 110 may comprise additional information associated with the client device 104. For example, the device information 110 may indicate content stored on the client device 104, a version of the stored content, and/or the like. In some embodiments, the device information 110 indicates changes to content stored by the client device 104 since a previous transmission of device information 110.

In some embodiments, the online system 102 periodically receives the device information 110 from the respective client device 104. As such, the online system 102 may be able to monitor a current geographic location of each of a plurality of client devices 104. In addition, in embodiments where the device information 110 comprises information indicating the content stored on the respective client device 104, the online system 102 is able to monitor the content stored by each of the client device 104. In some embodiments, different types of device information 110 may be received at different rates. For example, a client device 104 may transmit device information 110 comprising geographic information periodically (e.g., every minute, every hour, etc.), allowing for the online system 102 to monitor the geographic location of the client device 104. On the other hand, the client device 104 may transmit device information 110 indicating content stored by the client device 104 at a less frequent rate, or only when the content stored by the client device 104 is changed or updated.

In some embodiments, a rate at which the online system 102 receives device information from a client device 104 may be based upon a status of the client device 104. For example, the frequency at which the client device 104 transmits device information 110 to the online system 102 may be based upon a geographic location of the client device 104, the content stored by the client device 104, whether the client device 104 is connected to a network other than a cellular network (e.g., a Wi-Fi network), and/or the like. For example, the online system 102 may receive device information more frequently when the device is connected to a Wi-Fi network compared to when it is only connected to the online system 102 via a cellular network.

By monitoring the geographic locations of each of the client devices 104, the online system 102 can determine when the client devices 104A and 104B are within a predetermined distance from each other (e.g., a distance based upon an effective range of a limited range communication protocol (e.g., WiFi Direct, Bluetooth, NFC, and/or the like). If the client devices 104A and 104B are with the predetermined distance from each other, the online system 102 may determine whether to prompt the client devices 104 to establish a connection to communicate with each other.

In some embodiments, as part of determining whether to establish a connection, the online system determines whether the client devices 104A and 104B have content to share with each other. In this example, the online system 102 determines, based upon the device information 110A, that the version 106A of the file stored by the client device 104A is newer than the version 106B of the file stored by the client device 104B, and that the version 106A can be shared with client device 104B. In some embodiments, the online system 102 performs this determination based upon previously received device information 110. In other embodiments, the online system 102 may request additional device information 110 at the time of the determination, in order to ensure that the information indicating the content stored on the client devices 104A and 104B is up to date. In addition, the online system 102 may verify that the version of the file 106A stored on the client device 104A is compatible with the client device 104B.

The online system 102 determines that the client device 104A has a newer version of the file 106 in comparison to the client device 104B, and transmits connection information 120A and 120B to the client devices 104A and 104B indicating that a connection is available. The connection information 120A may comprise an identifier corresponding to the client device 104B, while the connection information 120B comprises an identifier corresponding to the client device 104A. In addition, the connection information 120 may indicate a type of connection to be established, a password, encryption key, and/or other authentication information to be used in establishing the connection, information indicating a purpose of the connection (e.g., the content to be transmitted or received), and/or the like. In response to receiving the connection information 120, the client devices 104A and 104B to detect 130 each other and establish 140 a communication link.

In some embodiments, the client devices 104A and 104B, in response to receiving the connection information 120 from the online system 102, may notify a respective user of the client devices and confirm that they wish to establish the connection and transmit/receive content, whereupon the connection is established only upon approval by the respective users. For example, the client device 104B may display a notification informing its user that the client device 104A has a newer version of the file 106, prompting the user to indicate whether or not they would like to establish a connection to receive the newer version of the file. Similarly, the client device 104A may display a notification informing its user that it can share content with a client device of a trusted user, prompting the user of the client device 104A to indicate whether or not they would like to establish the connection to share the content.

In some embodiments, the online system 102 transmits the connection information 120 based upon one or more user preferences. For example, the user associated with the client device 104A may indicate a preference that they are willing to share versions of the file 106 with client devices having older versions of the file. As such, the online system 102, upon detecting that the client devices 104A and 104B are within the predetermined distance from each other, may transmit the connection information 120 to the client devices 104A and 104B. In other embodiments, the user of the client device 104A may indicate that they do not wish to share the version of the file 106, whereupon the online system 102 may determine that connection information 120 should not be transmitted to the client devices 104A and 104B.

In some embodiments, the detection 130 between the client devices 104A and 104B may comprise each of the client devices broadcasting a limited range signal. The limited range signal broadcast may comprise an identifier associated with the user of the client device 104 (e.g., an identifier assigned by the online system 102). For example, the client device 104A receiving the limited range signal broadcast by the client device 104B signifies that the client devices 104A and 104B are within range for establishing a P2P limited range wireless connection according to the limited range communication protocol. The client device 104A may verify that the identifier received as part of the limited range signal matches the identifier for the client device 104B specified in the connection information 120B. Similarly, the client device 104B may receive the limited range signal comprising an identifier broadcast by the client device 104A, and verify the identifier using the received connection information 120B.

In some embodiments, the detection 130 between the client devices 104A and 104B may comprise the client device 104A acting as a host to create a limited range connection point (e.g., Wi-Fi hotspot or Bluetooth network), whereupon client device 104B requests access the limited range connection point using the connection information 120B (e.g., comprising a password or other authentication information). The client device 104A may accept the request by authenticating the received connection information.

In response to the client devices 104A and 104B detecting the broadcast limited range signal, a limited range wireless connection 140 is established between client device 104A and 104B according to the limited range communication protocol. The client device 104A is then able to transmit 150 the second version 106B of the file to client device 104B via the established connection 140.

In some embodiments, instead of determining whether there is content to share prior to establishing a connection, the connection 140 is established first and then a determination is made as to whether either client device 104 has content to share. For example, after the establishment 140 of the connection, the client devices 104 may exchange content version information, in order to determine which content to transfer over the established communication link.

Advantageously, the client devices 104 may share content through the limited range wireless connection 140 with enhanced security and reduced cost. Establishing the connection 140 according to trusted users determined based on the social network connections ensures a secure connection between two client devices 104 operated by acquainted individuals in the social network service, rather than devices 104 operated by random users that could potentially provide malicious content (e.g., a virus or spyware). Further, since the content is shared using a limited range communication protocol, a client device 104 can transmit or receive content while minimizing or eliminating the use of a data plan with a wireless service provider to receive the content. For example, a client device 104 does not have to rely on an expensive subscribed connection with a wireless service provider to receive the latest version of a mobile application. While the communication between the online system 102 and the client devices 104 (e.g., transmission of device information 110 and connection information 120) may be transmitted over the subscribed connection, the amount of data needed to transmit the device information 110 and the connection information 120 may be small in comparison to the amount of data needed to transmit the content. As such, by coordinating the establishment of the limited range wireless connection 140 using the online system 102, the amount of data transmitted over the subscribed connection may be reduced, while maintaining security by only establishing connections between client devices of trusted users.

System Architecture

Figure 2:
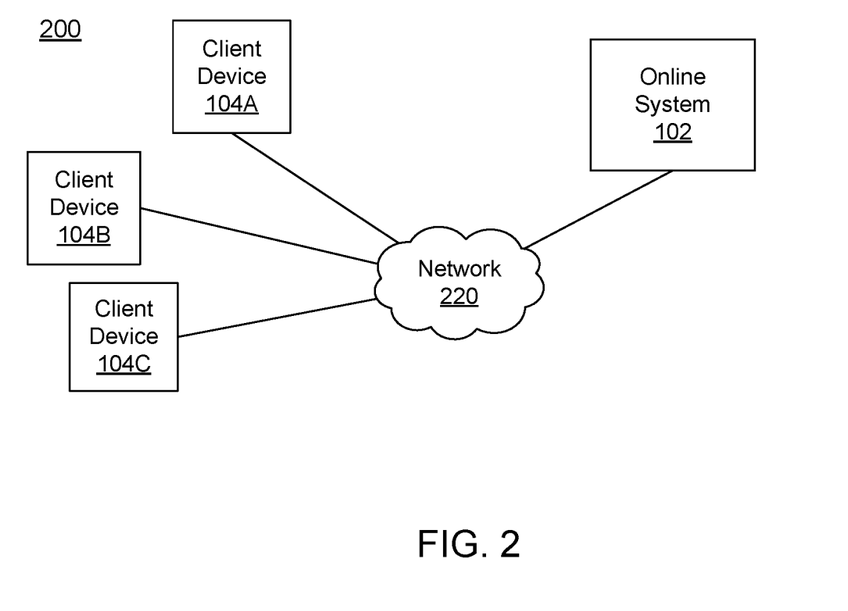
FIG. 2 is a block diagram of a system environment for an online system, according to one embodiment.

FIG. 2 is a block diagram of a system environment for sharing content through a direct P2P wireless connection, according to one embodiment. The system environment 200 includes client devices 104A, 104B, and 104C, and an online system 102 connected via a network 220. In alternative configurations, different and/or additional components may be included in the system environment 200 (e.g., additional client devices 104 and online systems 102).

The network 220 represents communications pathways between the client devices 104, the online systems 102. The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 2G, 3G, 4G, code division multiple access (CDMA), digital subscriber line (DSL), etc.

A client device 104 is a computing device capable of receiving user inputs as well as sending and/or receiving data via the network 220. The client device 104 may be a laptop computer, or a mobile device, such as a mobile telephone, a smartphone or a personal digital assistant (PDA). In one embodiment, the client device 104 interacts with other entities in the network 220 through an application programming interface (API) running on a native operating system of the client device 104, such as IOS® or ANDROID™.

A user operates a client device 104 to interact with the online system 102 and/or client device 104. For example, a user can communicate through a client device 104 with the online system 102 to obtain content, such as news articles, webpages, text, videos, audio, images, and any other suitable data for presentation to the user. The user may also communicate with the online system 102 through a client device 104 to obtain social networking content, such as a social networking profile page and content shared by connections of the user (e.g., comments, posts, messages, images, links, etc.). The online system 102 may also provide content items, such as advertisements to a client device 104.

An online system 102 is a computer system that officiates direct P2P wireless connections among client devices 104. The online system 102 receives device information from the client devices 104, and receives social network connection information from a social network service provider (e.g., a server computer) through the network 220. In some embodiments, the online system 102 and the social network service provider may be integrated together. The online system 102 generates and maintains one or more data structures indicating connections between users indicating a trusted relationship, based on the device information and the social network connection information. Based on the trusted users data structure and received geographic location information of the client devices 104, the online system 102 may determine which client devices 104 can establish direct P2P wireless connections. Details of generating the trusted users data structure are provided below with respect to FIGS. 3 and 5. Details of establishing direct P2P wireless connections are provided below with respect to FIGS. 4 and 5.

In some embodiments, client devices 104 may establish P2P wireless connections between each other in order to transmit content between them, based upon a version of the content stored by each client device 104. For example, a client device 104 having a newer version of the content in comparison to another client device 104 may transmit the newer version of the content to the other client device 104 through the P2P wireless connection, allowing for the other client device 104 to obtain the newer version of the content without needing to utilize a wireless service plan (e.g., a cellular data plan). In some embodiments, the online system 102 may determine a version of the content possessed by each of the client devices 104 (e.g., based upon received device information 110) and a relationship between the users associated with each client device 104 (e.g., using the trusted user data structure), in order to determine whether a pair of client devices 104 should establish a P2P wireless connection. In some embodiments, the first and second client devices 104A and 104B exchange content version information when establishing the P2P wireless connection or after the P2P wireless connection is established, in order to determine whether to transmit or receive content between them.

Figure 3:
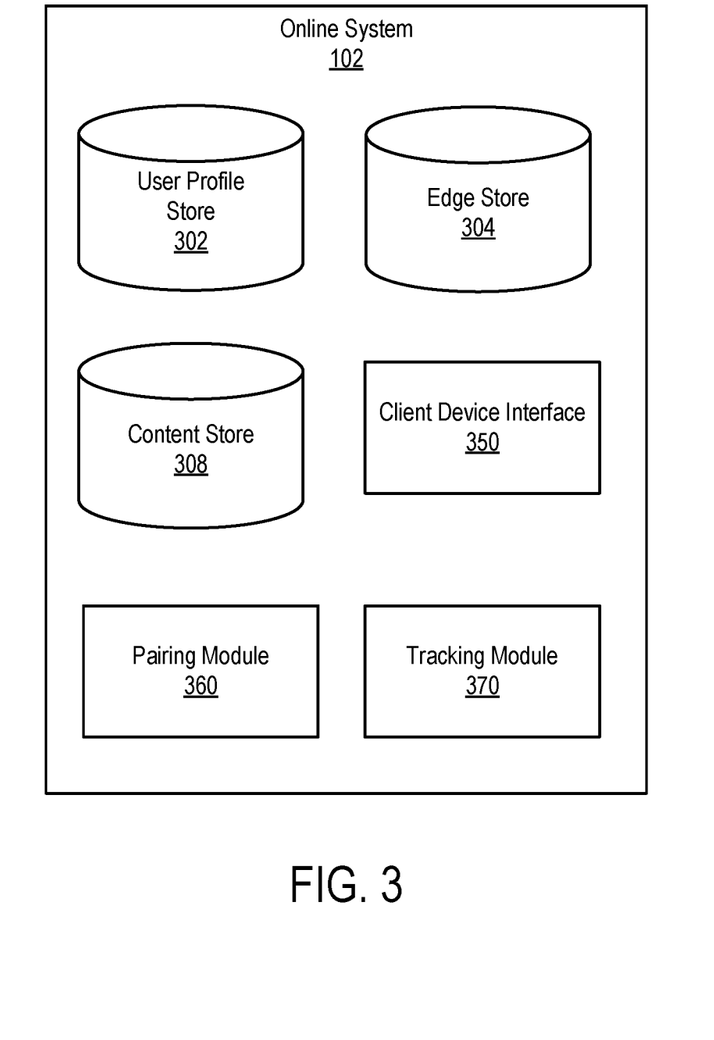
FIG. 3 is a block diagram of an architecture of the online system, according to one embodiment.

FIG. 3 is an example block diagram of the architecture of the online system 102, according to one embodiment. In the embodiment of FIG. 3, the online system 102 includes a user profile store 302, edge store 304, content store 308, client device interface 350, pairing module 360, and tracking module 370. In other embodiments, the online system 102 may include additional, fewer, or different components for various applications. Conventional components such as network interfaces, security functions, load balancers, failover servers, management and network operations consoles, and the like are not shown so as to not obscure the details of the system architecture.

Each user of the client device 104 is associated with a user profile, which is stored in the user profile store 302. The user profile includes declarative information about the user that was explicitly shared by the user and may also include profile information inferred by the client device 104. In one embodiment, a user profile includes multiple data fields, each describing one or more attributes of the corresponding user of the client device 104. Examples of information stored in a user profile include biographic, demographic, and other types of descriptive information such as work experience, educational history, gender, hobbies or preferences, geographical information, that describes characteristics of users. A user profile may also store other information provided by the user, for example, images or videos.

While user profiles in the user profile store 302 are frequently associated with individuals allowing individuals to interact with each other via the client device 104, user profiles may also be stored for entities such as businesses or organizations. This allows an entity to establish a presence on the client device 104 for connecting and exchanging content with other users of the client device 104. The entity may post information about itself, about its products or provide other information to users of the client device 104 using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

In one embodiment, the edge store 304 stores information describing social network connections between users and other objects on the client device 104 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the client device 104, such as expressing interest in a page on the social networking system, sharing a link with other users of the social networking system, and commenting on posts made by other users of the social networking system. Users and objects within the client device 104 can be represented as nodes in a social graph that are connected by edges stored in the edge store 304. As one example, the trusted users from a given user's social network may include the nodes that are directly connected to the given user's node in the social graph. In another example, the trusted users might be expanded to include friends of friends, or nodes that are connected to the nodes in the prior example.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the client device 104, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 304 also stores information about edges, such as affinity scores for objects, interests, and other users. Affinity scores, or "affinities," may be computed by the client device 104 or the online system 102 over time to approximate a user's affinity for an object, interest, and other users based on the actions performed by the user. A user's affinity may be computed by the client device 104 or the online system 102 over time to approximate a user's affinity for an object, interest, and other users based on the actions performed by the user. Computation of affinity is further described in U.S. patent application Publication Ser. No. 12/978,265, filed on Dec. 23, 2010, U.S. patent application Publication Ser. No. 13/690,254, filed on Nov. 30, 2012, U.S. patent application Publication Ser. No. 13/689,969, filed on Nov. 30, 2012, and U.S. patent application Publication Ser. No. 13/690,088, filed on Nov. 30, 2012, each of which is hereby incorporated by reference in its entirety. Multiple interactions between a user and a specific object may be stored as a single edge in the edge store 304, in one embodiment. Alternatively, each interaction between a user and a specific object is stored as a separate edge. In some embodiments, connections between users may be stored in the user profile store 302, or the user profile store 302 may access the edge store 304 to determine connections between users.

The content store 308 stores content (e.g., electronic documents, web page, electronic video files, electronic images, installation packages or other executable files, etc.). The content store 308 may receive content from other server computers (e.g., social network service provider) or client devices 104 through the network 220. The content stored by the content store 308 may be provided to one or more client devices 104.

The client device interface 350 receives device information from client devices 104. The client device interface 350 may receive the device information periodically, when a client device 104 establishes a connection with the online system 102, or when requested by the online system 102. The device information of a client device 104 indicates at least a user associated with the client device 104 or a user name of the user. In some embodiments, the device information of a client device 104 may also comprise additional information, such as information indicating a geographic location of the client device 104, a listing of content stored by the client device 104, and/or the like. For each client device 104, the client device interface 350 determines an identifier for the client device 104. In some embodiments, the identifier comprises a unique identifier assigned to the user associated with the client device, or may by a randomly generated identifier for the user for purposes of establishing P2P wireless connections. The determined identifiers may be shared with the pairing module 360 for determining trusted users for establishing direct P2P wireless connections. In addition, the determined identifier may be stored by the user profile store 302.

The pairing module 360 receives device information from the client device interface 350 and social network connection information from the edge store 304, and determines trusted users for each of a plurality of client devices, according to the device information and the social network connection information. For example, the pairing module 360 may generate, for each client device 104, list data indicating a list of trusted users. The list data may include a list of user names or encoded user names of users, who are (i) connected to a user of the client device 104 in a social network and (ii) associated with client devices able to establish a direct P2P wireless connection with the client device 104 for content transfer. In some embodiments, the pairing module 360 generates a trusted users data structure indicating social network connections between users associated with different client devices.

In some embodiments, the pairing module 360 may receive information indicating content stored by client devices 104 from the client device interface 350, and performs content groupings of users of the client devices 104 according to content stored by the client devices 104. For example, the pairing module 360 groups a plurality of users into a first content group comprising users associated with a first set of client devices 104 including a latest installation package, and a second content group comprising users associated with a second set of client devices 104 lacking the latest installation package.

In some embodiments, the pairing module 360 receives location information of the client devices 104 from the client device interface 350, and performs geographical groupings of the users of the client devices 104 according to geographical locations of the client devices 104. Geographical grouping may be performed per predetermined regions, where each predetermined region corresponds to a geographic region (e.g., a city or state) where the client device 104 is determined to mostly likely be located.

The pairing module 360 generates the trusted users data structure indicating trusted users for each client device 104 based on a social network connection of a user associated with the client device 104. For example, the data structure may contain, for each client device 104, identifiers for other client devices associated with users having a particular social network connection with the user of the client device 104 (e.g., have a "friend" or "trusted" connection with the user of the client device).

In some embodiments, as discussed above, the generated data structure may further be based upon a content grouping, a geographical grouping, and/or other type of grouping. Assuming for an example that a first client device 104A operated by a first user stores content (e.g., updated installation package file) that can be shared. In this example, the pairing module 360 performs a logical AND operation on (i) a content group comprising users associated with client devices 104 not storing the content, (ii) a geographical group comprising users associated with client devices 104 located within a predetermined region associated with the first client device 104A, and (iii) users included in a social network connection of the first user, to identify trusted users of the first user. Assuming for another example that a second client device 104B operated by a second user does not store content (e.g., updated installation package file) or store an older version of the content. In this example, the pairing module 360 performs a logical AND operation on (i) a content group comprising users associated with client devices 104 storing the content, (ii) a geographical group comprising users associated with client devices 104 located within a predetermined region associated with the second client device 104B, and (iii) other users included in a social network connection of the second user, to identify trusted users of the second user.

The tracking module 370 monitors the geographic location of each client device 104 based upon geographic location information associated with each client device 104 received from the client device interface 350. In addition, the tracking module 360 determines when pairs of client devices 104 having a "trusted" relationship as determined by the pairing module 360 are within a predetermined distance from each other. In response to determining that the geographic locations of the pair of client devices 104 are within the predetermined distance from each other, the tracking module 370 may cause the client device interface 350 to transmit connection information (e.g., connection information 120) to the client devices 104.

Figure 4:
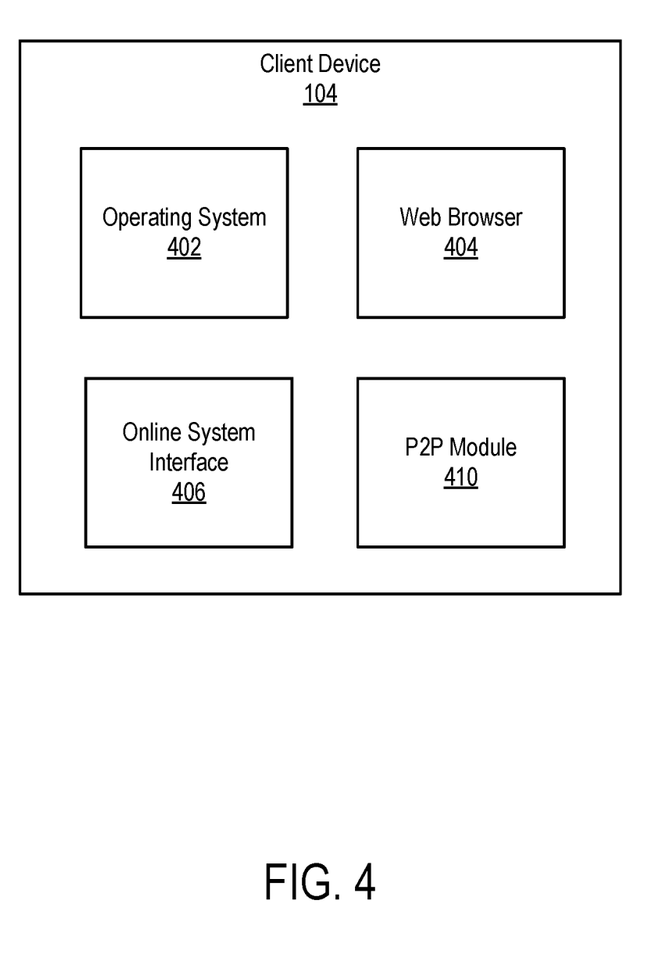
FIG. 4 is a block diagram of an architecture of a client device, according to one embodiment.

FIG. 4 is a block diagram of an architecture of a client device 104. The client device 104 shown in FIG. 4 includes an operating system 402, a web browser 404, an online system interface 406, and a P2P module 410. In other embodiments, the client device 104 may include additional, fewer, or different components for various applications.

The operating system 402 manages hardware and software resources of the client device 104. The operating system 402 provides applications of the client device 104 with access to services through application program interfaces (APIs). Additionally, the operating system 402 provides user interfaces that allow users to interact with the client device 104.

The web browser 404 allows a user to access web pages including content. The web browser 404 may receive a user request through a user input (e.g., a click, a swipe, or an address of a specific domain) to access a certain content item, and retrieve the requested content item from the online system 102 or other publishing system. The web browser 404 renders a page including texts, images, audios, videos, an interactive content (e.g., games or educational content), or any combination of them, and presents the page to a user.

The online system interface 406 interfaces with the online system 102. The online system interface 406 may interface the client device interface 350 of FIG. 3 through a subscribed network connection (e.g., a cellular network). The online system interface 406 may generate device information indicating a user associated with a client device 104 and transmit the device information to the online system 102. The device information may also indicate geographical location information for the client device 104. In some embodiments, the device information may comprise additional information, such as, content stored by the client device 104, and a version of each content. The online system interface 406 may transmit the device information periodically (e.g., once a day), when establishing a connection with the online system 102, or when requested by the online system 102. In some embodiments, different types of device information may be transmitted to the online system 102 at different rates. For example, in some embodiments, geographic location information for the client device 104 may be transmitted at regularly (e.g., once per minute, once per hour, and/or the like), while information indicating the content stored by the client device 104 may only be transmitted when the content changes (e.g., the version of the content changes).

The online system interface 406 is further configured to receive connection information from the online system 102. For example, the online system 102 may determine that the client device 104 is within a predetermined distance from a client device associated with a trusted user, with which the client device may transmit or receive content. In response, the online system 102 transmits connection information to the client device 104, prompting the client device 104 to attempt to detect the other client device in order to establish P2P wireless communication. In some embodiments, the connection information comprises an identifier of the other client device or a user of the other client device. In addition, the connection information may comprise an indication of a type of connection to be established or a purpose of the connection (e.g., an indication of content to be transmitted or received).

The P2P module 410 establishes a connection with another P2P module of another client device, based upon the connection information received from the online system 102. In one embodiment, the P2P module 410 generates a limited range signal, and broadcasts or transmits the limited range signal. The limited range signal includes a user name of a user operating the transmitting client device transmitting the limited range signal, and/or an identifier corresponding to the user. Alternatively, the P2P module 410 encodes the user name (and/or identifier), and includes the encoded user name in the limited range signal instead. The encoding may be time dependent such that a first encoding of a user name at a first time may be different from a second encoding of the user name at a second time. The P2P module 410 of a receiving client device 104 receiving the limited range signal may identify the user (or the user name or other type of identifier) associated with the transmitting client device 104 according to the limited range signal, and determines whether the user matches an identifier indicated by the connection information received by the receiving client device. In some embodiments, the P2P module receiving the limited range signal may compare an encoded user name/identifier from the received signal with an encoded user name/identifier received as part of the connection information. After determining that the user matches with the received connection information, the P2P module 410 of the receiving client device 104 can establish a direct P2P wireless connection with the transmitting client device 104. Examples of establishing a direct P2P wireless connection is provided below with respect to FIG. 5.

Example Process

Figure 5:
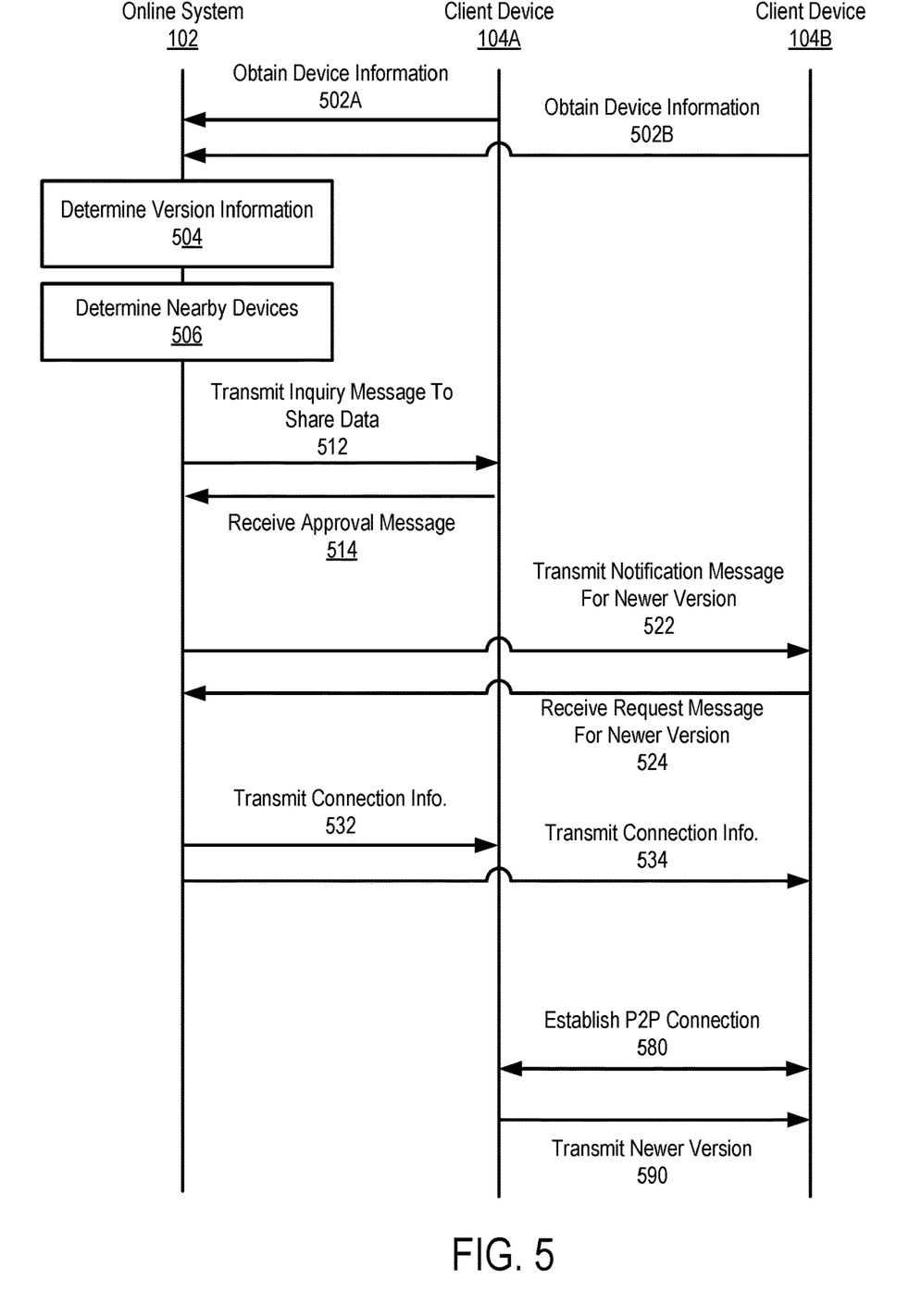
FIG. 5 is an interaction diagram illustrating a process for establishing a direct P2P wireless connection, according to one embodiment.

FIG. 5 is an interaction diagram illustrating a process for establishing a direct P2P wireless connection, according to one embodiment.

The online system 102 obtains 502A device information of client device 104A from the client device 104A and obtains 502B device information of client device 104B from the client device 104B. The device information indicates a user associated with a client device 104. In some embodiments, the device information may also indicate a geographical location of the client device 104, content stored by the client device (e.g., a version of the stored content), etc. The online system 102 also obtains social network connection information, for example, from a social network service provider.

The online system 102 determines 504 version information of the content stored on each of the client devices 104, based upon the received device information. For example, in some embodiments, the client device 104A may store a first version of a file, while the client device 104B stores a second version of the file, wherein the first version of the file is newer than the second version of the file.

The online system 102 determines 506 whether the client devices 104A and 104B are near each other (e.g., within a predetermined distance from each other), based upon geographic information received as part of the device information for each client device 104. In some embodiments, the online system 102 determines that the client devices 104A and 104B are associated with users having a social network connection indicating that the user of the client device 104A has a trusted relationship with the user of the client device 104B, and vice versa. In addition, the online system 102 may further determine that the client device 104A has a newer version of a piece of content (e.g., the file 106) that can be transmitted to the client device 104B.

Once the online system 102 determines that the client devices 104A and 104B are near each other, the online system 102 may transmit connection information to the client devices 104A and 104B. In some embodiments, prior to transmitting connection information, the online system 102 may verify that each of the client devices 104 is willing and able to establish the connection to transmit/receive content.

For example, the online system 102 transmits 512 a message to the client device 104A, inquiring as to whether the client device 104A is willing to share its stored content with the client device 104B. The message may comprise an identifier of the user associated with the client device 104B and an indication of the content to be transmitted to the client device 104B.

The online system 102 receives 514 in response an approval message from the client device 104A. The approval message indicates that the user of the client device 104A is willing to share content with the client device 104B. In some embodiments, the approval message may further indicate the version of the content stored by the client device 104A, in order to confirm or update the device information for the client device 104A stored by the online system 102.

In some embodiments, the approval message may be based upon an input of the user associated with the client device 104A. For example, the client device 104A, responsive to receiving the inquiry from the online system 102, may display a message to the user indicating the option to transmit content to the client device 104B. The user, upon viewing the message, may opt to approve establishing communication with the client device 104B to transmit the content, or may reject establishing communication with the client device 104B.

In some embodiments, the approval message from the client device 104A may be based upon stored preference data of the client device 104A. For example, the client device 104A may store one or more preference settings indicating that the user of the client device 104A is willing to share content with client devices of trusted users (e.g., client device 104B). As such, the client device 104A may in some embodiments transmit the approval message without user input.

In addition, the online system 102 may transmit 522 a notification message to the client device 104B, indicating that a newer version of content is available to the received. The notification message may comprise an identifier identifying the user of the client device 104A, as well as an indication of the content to be received.

The online system 102 receives 524 in response a request message from the client device 104B indicating a request to receive content (e.g., content of the new version stored by the client device 104B). In some embodiments, the client device 104B transmits the request message in response to input from the user associated with the client device 104B. For example, the client device 104B may, in response to receiving the notification message from the online system 102, display a notification to the user indicating that newer version content is available, and prompting the user to request the content (whereupon the request message is transmitted) or to deny the request. In some embodiments, the client device 104B transmits the request message based upon previously stored preference data, and as such may not require user input to transmit the request message. In some embodiments, the request message may indicate the version of the content currently stored by the client device 104B, in order to confirm or update the device information for the client device 104B stored by the online system 102.

It is understood that in some embodiments, the online system 102 may skip one or more of the steps discussed above. For example, the online system 102 may skip transmitting the inquiry message to the client device 104A and receiving the approval message from the client device 104A, and/or transmitting the notification message to the client device 104B and receiving the request message from the client device 104B.

The online system 102 generates and transmits 532 connection information to the client device 104A, and also generates and transmits 534 connection information to the client device 104B. The connection information may comprise an identifier corresponding to the client device to be connected to. In addition, the connection information may comprise information indicating the content to be transmitted or received. In some embodiments, the connection information comprises a password, encrypted key, or other type of authentication information that may be used by the client devices 104 to establish the connection.

In response to receiving the connection information, the client devices 104A and 104B establish 580 a direct P2P wireless connection between them. In one approach, the client device 104A broadcasts a first limited range signal identifying a user associated with the client device 104A, and the client device 104B broadcasts a second limited range signal identifying a user of the client device 104B. The client device 104A receives the second limited range signal from the client device 104B and detects that the client device 104B is nearby (i.e., within a predetermined range), and vice versa.

Furthermore, the client device 104A may confirm that content (e.g., a newer version of installation file) stored by the client device 104A can be shared with the client device 104B. In some embodiments, the second limited range signal broadcast by the client device 104B comprises information indicating the content stored on the client device 104B (e.g., version information), which may be used by the client device 104A to confirm that the version of the content stored by the client device 104A is newer than that stored by the client device 104B, and is as such suitable for transmission to the client device 104B.

The client device 104B receives the first limited range signal from the client device 104A and detects the client device 104A. Similarly, the client device 104B determines 576 that the client device 104A corresponds to the identifier indicated in the received connection information. Moreover, the client device 104B may determine that the client device 104B can receive the content from the client device 104A (e.g., based upon information received via the limited range signal broadcast from the client device 104A).

In some embodiments, to establish the direct P2P wireless connection, the client device 104A acts as a host to create a limited range connection point (e.g., Wi-Fi hotspot or Bluetooth network), and the client device 104B accesses the limited range connection point using the connection information. In one example, the connection information may be presented on a display of the client device 104A, and a user operating the client device 104B may manually enter the connection information to connect to the limited range network. In another example, the connection information received from the online system 102 may be automatically entered by the client device 104B to join the limited range network, and establish a direct P2P connection with the client device 104A. In some embodiments, the connection information may comprise a password or other authentication information. In some embodiments, the connection information may comprise information concerning a purpose of the connection (e.g., to transmit/receive a newer version of content).

After establishing the P2P connection, the client device 104A may transmit 590 the content (e.g., newer version of installation package file) to the client device 104B. An amount of data of the content may be a few Megabytes or more. In contrast, the transmissions between the online system 102 and the client devices 104 may correspond to a much smaller amount of data. Hence, users of the client devices 104 can benefit from cost saving by obviating an expensive subscribed wireless connection. Moreover, a connection with another device operated by an acquaintance in a social network (e.g., a "trusted user") allows for a more secure connection compared to a connection with a device operated by a random person.

Those of the skill in the art will recognize that other embodiments can perform the steps of FIG. 5 in different orders. Moreover, other embodiments can include different and/or additional steps than the ones described herein.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    monitoring, by an online system, at least a first geographic location corresponding to a first client device and a second geographic location corresponding to a second client device, the first and second client devices associated with respective first and second users connected within a social network;
    receiving, by the online system, a first version information data from the first client device indicating a version of an application stored by the first client device, and a second version information data from the second client device indicating a version of the application stored by the second client device;
    determining, by the online system, that the first client device and the second client device are located within a predetermined distance of each other, based upon the monitored first geographic location and second geographic location;
    responsive to determining that the first client device and the second client device are located within a predetermined distance of each other, comparing, by the online system, the received first version information data and the second version information data to determine that the first client device has a newer version of the application compared to the second client device;
    transmitting, by the online system, an inquiry message to the first client device, the inquiry message requesting an approval to share the newer version of the application;
    receiving, by the online system, an approval message from the first client device, the approval message approving sharing of the newer version of the application in response to the inquiry message;
    transmitting, by the online system, connection information to the first client device;
    transmitting, by the online system, the connection information to the second client device, wherein the transmitted connection information is used by the first client device and the second client device to establish a point to point communication between the first and second client devices; and
    wherein responsive to establishing the point to point communication between the first and second client devices, content is transmitted from the first client device to the second client device such that the application stored by the second client device can be updated to the new version of the first client device.

2. The computer-implemented method of claim 1, wherein the predetermined distance is within 2 m.

3. The computer-implemented method of claim 1, wherein the approval message is received based upon a user input by a user of the first client device.

4. The computer-implemented method of claim 1, further comprising:
    transmitting, by the online system, a notification message to the second client device, the notification message indicating an availability of the newer version of the application; and
    receiving, by the online system, a request message from the second client device, the request message requesting to update the application to the newer version.

5. The computer-implemented method of claim 4, further comprising:
    transmitting, by the online system, connection information to the first client device and the second client device in response to receiving the approval message from the first client device and the request message from the second client device.

6. The computer-implemented method of claim 1, further comprising:
    receiving, by the online system, first geographic information from the first client device, and second geographic information from the second client device,
    wherein the online system determines the first geographic location using the received first geographic information, and the second geographic location using the received second geographic information.

7. The computer-implemented method of claim 6, wherein the online system receives the first geographic information from the first client device and the second geographic information from the second client device periodically.

8. The computer-implemented method of claim 1, wherein the connection information indicates identifiers corresponding to the first and second client devices, and an indication of content to be transmitted between the first and second client devices via the point to point communication.

9. The computer-implemented method of claim 1, further comprising:
    transmitting, by the online system, connection information to the first client device and the second client device in response to receiving approval from the first client device approving sharing of the newer version of the application and in response to receiving a request from the second client device to update the application to the newer version.

10. A non-transitory computer readable medium storing program code, the program code comprising instructions that when executed by a processor cause the processor to:
    monitor, by an online system, at least a first geographic location corresponding to a first client device and a second geographic location corresponding to a second client device, the first and second client devices associated with respective first and second users connected within a social network;
    receive, by the online system, a first version information data from the first client device indicating a version of an application stored by the first client device, and a second version information data from the second client device indicating a version of the application stored by the second client device;
    determine, by the online system, that the first client device and the second client device are located within a predetermined distance of each other, based upon the monitored first geographic location and second geographic location;
responsive to determining that the first client device and the second client device are located within a predetermined distance of each other, compare, by the online system, the received first version information data and the second version information data to determine that the first client device has a newer version of the application compared to the second client device;
transmit, by the online system, an inquiry message to the first client device, the inquiry message requesting an approval to share the newer version of the application;
receive, by the online system, an approval message from the first client device, the approval message approving sharing of the newer version of the application in response to the inquiry message;
transmit, by the online system, connection information to the first client device;
transmit, by the online system, the connection information to the second client device, wherein the transmitted connection information is used by the first client device and the second client device to establish a point to point communication between the first and second client devices; and
wherein responsive to establishing the point to point communication between the first and second client devices, content is transmitted from the first client device to the second client device such that the application stored by the second client device can be updated to the new version of the first client device.

11. The non-transitory computer readable medium of claim 10, wherein the predetermined distance is within 2 m.

12. The non-transitory computer readable medium of claim 10, wherein the approval message is received based upon a user input by a user of the first client device.

13. The non-transitory computer readable medium of claim 10, further comprising instructions that when executed by the processor cause the processor to:
transmit, by the online system, a notification message to the second client device, the notification message indicating an availability of the newer version of the application; and
receive, by the online system, a request message from the second client device, the request message requesting to update the application to the newer version.

14. The non-transitory computer readable medium of claim 13, further comprising instructions that when executed by the processor cause the processor to:
transmit, by the online system, connection information to the first client device and the second client device in response to receiving the approval message from the first client device and the request message from the second client device.

15. The non-transitory computer readable medium of claim 10, further comprising instructions that when executed by the processor cause the processor to:
receive, by the online system, first geographic information from the first client device, and second geographic information from the second client device,
wherein the online system determines the first geographic location using the received first geographic information, and the second geographic location using the received second geographic information.

16. The non-transitory computer readable medium of claim 15, wherein the online system receives the first geographic information from the first client device and the second geographic information from the second client device periodically.

17. The non-transitory computer readable medium of claim 10, wherein the connection information indicates identifiers corresponding to the first and second client devices, and an indication of content to be transmitted between the first and second client devices via the point to point communication.

18. The non-transitory computer readable medium of claim 10, further comprising instructions that when executed by the processor cause the processor to:
transmit, by the online system, connection information to the first client device and the second client device in response to receiving approval from the first client device approving sharing of the newer version of the application and in response to receiving a request from the second client device to update the application to the newer version.

* * * * *